United States Patent
Annan et al.

[11] Patent Number: 6,154,167
[45] Date of Patent: Nov. 28, 2000

[54] EXCITATION METHOD AND ULTRA-WIDE BANDWIDTH ANTENNA FOR GROUND PENETRATING RADAR SYSTEMS

[75] Inventors: Alexander Peter Annan, Mississauga; Charles David Leggatt, Toronto, both of Canada

[73] Assignee: Sensors & Software Inc., Mississauga, Canada

[21] Appl. No.: 09/273,462

[22] Filed: Mar. 22, 1999

Related U.S. Application Data

[60] Provisional application No. 60/078,706, Mar. 20, 1998.

[51] Int. Cl.[7] ........................................ G01V 3/12
[52] U.S. Cl. .......................... 342/22; 342/175; 342/198
[58] Field of Search ............................ 342/22, 190, 191, 342/175, 198, 203

[56] References Cited

U.S. PATENT DOCUMENTS

| | | |
|---|---|---|
| 5,327,139 | 7/1994 | Johnson ........................... 342/22 |
| 5,357,253 | 10/1994 | Van Etten et al. .................. 342/22 |
| 5,650,670 | 7/1997 | Thaxter ........................... 307/106 |
| 5,680,048 | 10/1997 | Wollny ............................ 324/329 |
| 5,837,926 | 11/1998 | Franklin .......................... 102/427 |
| 5,952,561 | 9/1999 | Jaselskis et al. ................... 73/78 |
| 5,952,954 | 9/1999 | Beckner .......................... 342/22 |
| 5,969,661 | 10/1999 | Benjamin ......................... 342/22 |

FOREIGN PATENT DOCUMENTS

| | | | |
|---|---|---|---|
| 2234597A1 | 9/1999 | Canada ........................ F41H 11/16 |
| 2266214A1 | 9/1999 | Canada ........................ G01V 3/12 |
| 2266222A1 | 9/1999 | Canada ........................ G01S 7/02 |
| 9963361A1 | 9/1999 | WIPO ........................... G01S 13/02 |

*Primary Examiner*—John B. Sotomayor
*Attorney, Agent, or Firm*—Eugene J. A. Gierczak

[57] ABSTRACT

A novel method of creating and detecting ultra wide bandwidth signals in a ground penetrating radar context.

20 Claims, 3 Drawing Sheets

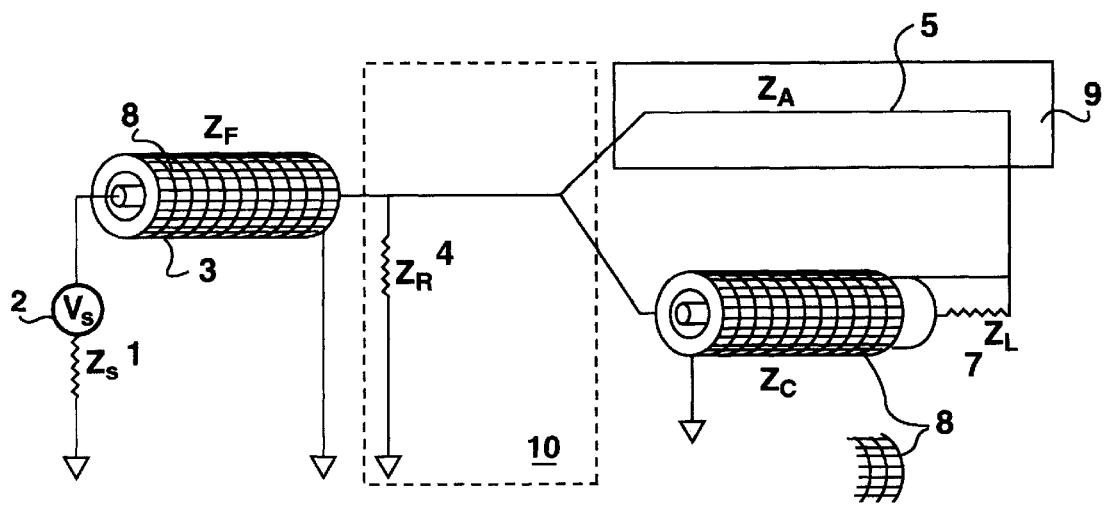
FIG. 4
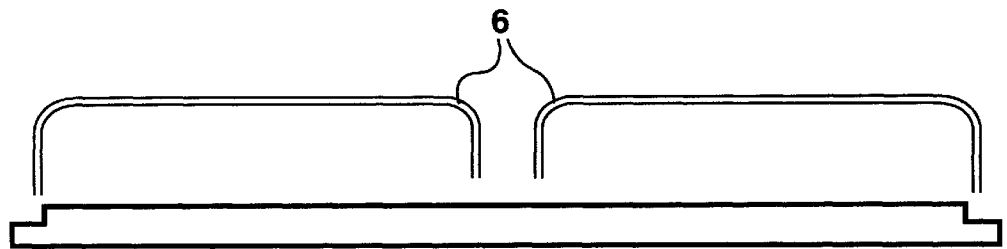
FIG. 5 — Thin wire arm as an etched track on a PCB
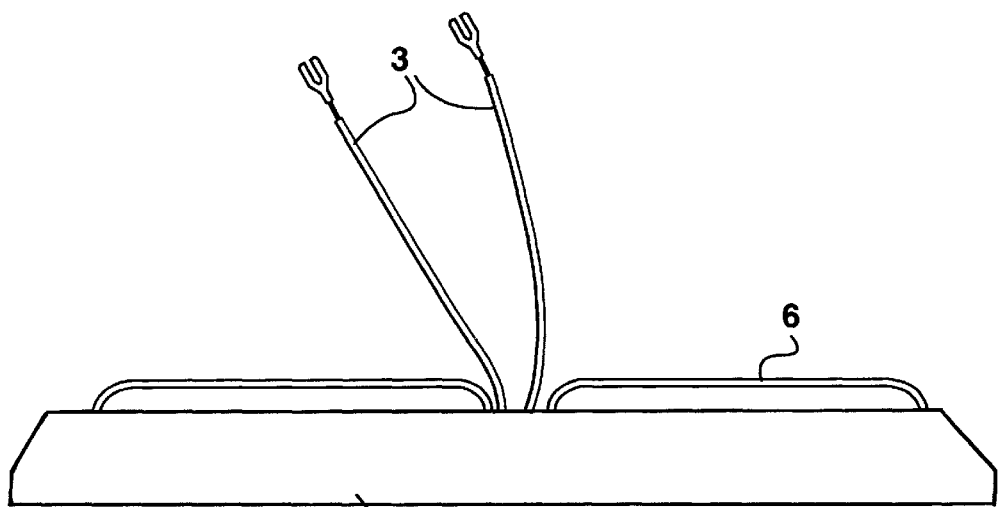
FIG. 6 — Potted antenna arm

Typical Range of Applications for GPR and Other Geophysical Transducers

| Area | Application |
|---|---|
| Agriculture | Drainage pipe location |
| Agriculture | Roots |
| Agriculture | Soil compaction |
| Agriculture | Water content |
| Airports | Base course thickness |
| Airports | Cavities in walls |
| Airports | Cavities under floors |
| Airports | Compaction of base course |
| Airports | Concrete base/rebar |
| Airports | Conduits/utilities |
| Airports | Cracks within road/runway |
| Airports | Drainage/culverts |
| Airports | Embassy counter espionage |
| Airports | Hidden materials |
| Airports | Ice on runways |
| Airports | Ice strips/landing |
| Airports | Moisture content of base course |
| Airports | Pavement quality |
| Airports | Pavement thickness/delamination |
| Airports | People detection |
| Airports | Pipes/cables/tanks |
| Airports | Structural elements |
| Airports | Stud finder |
| Airports | Thickness QA/QC |
| Airports | Voids under road/runway |
| Airports | Wall imaging |
| Airports | Wall thickness |
| Archeology | Artifacts |
| Archeology | Foundations/Area Construction |
| Archeology | Graves |
| Archeology | Monument imaging |
| Archeology | River/Lake bottom |

Figure 7

EXCITATION METHOD AND ULTRA-WIDE BANDWIDTH ANTENNA FOR GROUND PENETRATING RADAR SYSTEMS

This applications claims the benefit of U.S. Provisional Ser. No. 60/078,706 filed Mar. 20, 1998.

FIELD OF INVENTION

This invention relates generally to ground penetrating radar applications and more specifically is a novel means of creating and detecting ultra wide bandwidth (UWB) signals. This invention could see use in other fields involving UWB radars for stealth aircraft detestion, collision avoidance and through wall imaging.

BACKGROUND OF INVENTION

Ground penetrating radar (GPR) is a technique whereby electromagnetic signals are transmitted through a material to detect variability or changes within the material. (Annan, A. P., Davis, J. L., *Ground Penetrating Radar—Coming of Age at Last;* 199; Proceedings of the Fourth Decennial International Conference on Mineral Exploration (Exploration '97), Toronto, Canada, Sep. 14 to Sep. 18, 1997).

The objective is to create an ultra-wide band electromagnetic signal generation source which has controlled or predictable directionality, polarization and bandwidth. In most practical implementations, an electric dipole or variation on this type of antenna is normally used. The advantage of a relatively short electric dipole is that it has controlled directivity and polarization characteristics across the whole spectral bandwidth that can be energized. (Samaddar, S. N. and Mohole, E. L., *Some Basic Properties of Antennas Associated with Ultra Wide-band Radiation: Ultra wideband, Short-Pulse Electromagnetics,* 1997; 3, Baum et al, Plennum Press, New York, p. 147). Unlike conventional communications antenna needs, where tuned resonant antennas are used for efficiency, the GPR and other UWB radar antennas must deliver impulse response fidelity with efficiency being of secondary importance.

A number of names are given to radar systems with very wide bandwidths. Ground penetrating radar is the name applied to ultra-wide band, impulse style, or base-band radar systems that are used to probe into earth materials or man-made construction materials that form buildings, roads or other such structures. In general, these lossy dielectric materials can be penetrated to some depth and the structure inside mapped. To be effective the transducers must generate very wide-band signals so that the features can be resolved. At the same time the polarization and the directivity have to be controllable or invariant. If not, then spatial mixing of polarization will make spatial deconvolution virtually impossible.

A simple dipole antenna source system (prior art as shown in FIG. 1) comprises a voltage source v(t) with a source impedance defined as which drives the feed point that is in the centre of a piece of wire. Currents flow along the thin wire, causing the emission of an electromagnetic field. (Samaddar, S. N. and Mohole, E. L., supra; Franceshetti, G. and Papas, C. H., *Pulsed Antennas;* 1974; IEEE Trans, AP. 22, p. 651). The electromagnetic wave field is the source of signals which are used to probe in the materials or applications described herein.

While depicted as a straight line, the dipole in some applications can be three-dimensional and, for example form a V with its vertex at the feed point. For the purposes of understanding electrical current flow, the antenna can be approximated to a first order by a parallel wire transmission line (prior art, as shown in FIG. 2). A parallel wire transmission line is the equivalent of the antenna arms for all intents and purposes. When such an approximation is made, the parallel wire transmission line has a characteristic impedance.

$$Z_A = \frac{Z_o \Omega}{2\pi} \quad (1)$$

where $Z_o$ is the host material electromagnetic impedance, and $$\Omega = 2\ln\frac{2h}{a} \quad (2)$$

where h is the antenna arm length and a is the wire diameter, and $\Omega$ is the geometric factor for the thin wire antenna arm impedance. The above approximation holds when the value of $\Omega$ is much greater than 1.

When the dipole antenna is mathematically approximated by the parallel wire transmission line, the termination at the end of the transmission line (which is called the load), $Z_L$, is very large. For all intents and purposes $$Z_L \approx \infty,$$

For GPR applications, the goal is to create an emitted electric field, which has a time variation, which is a close replica of the excitation voltage v(t). If $Z_S$ is equal to $Z_A$ and $Z_L = \infty$, a short time duration transient voltage v(t) will create a current $v(t)/Z_A$ which travels down the antenna arm, is reflected back to the source and absorbed into the source impedance. The current travels along the antenna arms (or transmission line) at velocity c, for the material hosting the antenna arms. The transit time for the current along the antenna arm and back to the source at the feed is $$2\frac{h}{c}.$$

Optimal performance is achieved when $Z_S$ is matched to $Z_A$. Unfortunately, achieving such a match is difficult to near impossible since $Z_A$ can be affected by changes in the surroundings when used in most applications. If $Z_S$ does not match $Z_A$ then all of the current is not absorbed back into the source and multiple reverberations of the current travel up and down the antenna arms dying out in time but re-radiating continually as they bounce back and forth.

FIG. 3 shows the general geometry of the antenna and the electric field at a distance from the dipole. Normally the dipole is usually considered small compared to the distance of the observation point away from the antenna. The electric field at a distance takes the form $$E_\Theta(R, \Theta, t) = \frac{1}{2\Omega R \sin\Theta} \left[ v(t) - v\left(t - \frac{h}{c}(1 - \cos\Theta)\right) - v\left(t - \frac{h}{c}(1 + \cos\Theta)\right) + v\left(t - \frac{2h}{c}\right) \right] \quad (3)$$

The temporal variation of the electric field is composed of several replicas of the excitation voltage. Depending on the duration of the excitation voltage and the antenna arm length, these events or replicas may overlap in time. The result is a smeared and rather complicated waveform. If the antenna arms could be made very long (i.e., let h→∞), then $$E_\Theta(R, \Theta, t) \approx \frac{1}{2\Omega R \sin\Theta} v(t) \quad (4)$$

Unfortunately this compromise is not practical in many applications and optimizing the performance of finite length of antennas is a critical subject.

As a further complication, if the source impedance and the antenna impedance $Z_S$ and $Z_A$ do not match, then the expression in Equation 3 will have addition terms representing additional radiation events from current which repeatedly bounces back and forth along the antenna arms. Again, an infinite series of terms is possible (Franceshetti, G. and Papas, C. H., *Pulsed Antennas;* 1974; IEEE Trans, AP. 22, p. 651).

Equation (3) will contain additional terms beyond the ones expressed here which are additional replicas of the excitation voltage created by radiation from discontinuities in the antenna. Numerous attempts have been made to emulate or achieve the result of h→∞ by adding loading to the antenna's arms or otherwise deforming the antennas into a different shape to try to make the current on the arm disappear. (Broome, N. L., *Improvements to Non-numerical Methods for Calculating the Transient Behaviour of Linear and Aperture Antennas;* 1979; IEEE Trans. Antennas Propagation, AP. 27, p. 51; Wu, T. T. and King, R. W. P., *The Cylindrical Antenna with non-reflecting Resistive Loading;* 1965; IEEE Trans Antennas Propation, AP. 13, p. 369); Shen, L. C. and Wu, T. T., *Cylindrical Antenna with Tapered Resistive Loading;* 1967; Radio Science 2, (pg.191).

Another approach to reducing multiple bounces of current along the arms is to minimize reflections from the ends of the antenna arms by effectively making $Z_A$ and $Z_L$ equal. In other words the load on the end of the antenna arms is matched to the impedance of the antenna arms and hence, the currents are absorbed at the ends of the antenna arms and vanish rather than being reflected back into the source. Should this type of matching be achieved, then the radiated field takes a slightly different form.

$$E_\Theta(R, \Theta, t) = \frac{1}{4\Omega R \sin\Theta}\left[2v(t) - (1+\cos\Theta)v\left(t - \frac{R+n(v\cos\Theta)}{c}\right) - (1-\cos\Theta)v\left(t - \frac{R+h(1+\cos\Theta)}{c}\right)\right] \quad (5)$$

In other words, the electric field is reduced from 4 to 3 time-delayed replicas of the excitation voltage. In addition to somewhat simplifying the radiated electric field shape versus time, this approach also reduces the dependency of making the source impedance match the antenna arm impedance. Anything, which will reduce the reverberation of the antenna currents on the arms, is of positive benefit in the battle to achieve wide bandwidth performance from a dipole antenna.

SUMMARY OF THE INVENTION

The present invention is an improved ultra bandwidth antenna with predictable radiation characteristics for ground penetrating radar and related UWB radar applications.

The wider the signal bandwidth, the shorter the time duration of the signal attainable which improves the resolving power of the radar. The displayed signal generally shows the direct transmitter to receiver excitation signal as the initial event followed later in time by delayed (and possibly modified) versions of the excitation signal. Delay time depends on the distance to a change in electromagnetic impedance and the velocity of electromagnetic signal propagation along the signal path to this change. This interrelation between time and distance is a key feature of GPR.

Temporal duration of individual signals and the relative amplitudes define the minimum distinguishable time between two signal occurrences that can be resolved. In the radar context, time separation is implicitly a measure of spatial separation. Time resolution therefore indicates spatial resolution.

The vector nature of the radiated signals requires invariance of the antenna transfer function versus frequency to maximize extraction of information from return signals. When the antenna response is predictable, amplitude information can be used to making inferences about the shape and composition of radar targets.

BRIEF DESCRIPTION OF DRAWINGS

A detailed description of the preferred embodiment is provided herein below by way of example only with reference to the following drawing, in which:

FIG. 4 is a schematic of a circuit diagram of the preferred embodiment.

FIG. 5 is a photographic representation of an antenna fabrication.

FIG. 6 is a photographic representation of a final antenna construction.

FIG. 7 is a table outlining the different applications of the invention.

Figure 1:
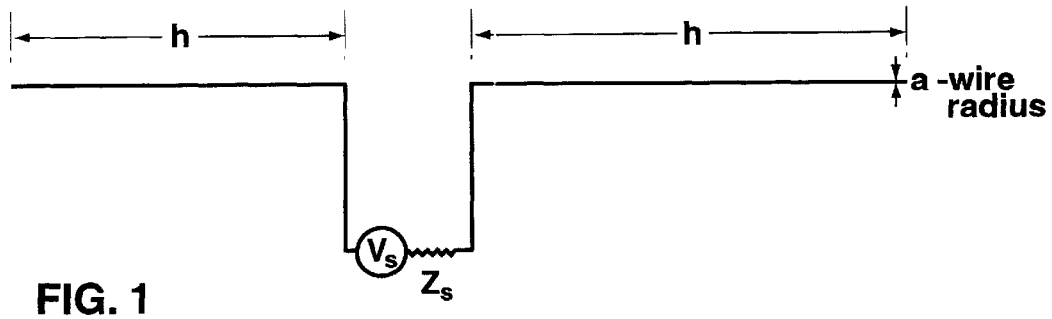
FIG. 1 is a schematic of a centre fed dipole antenna driven by a voltage source $V_s(t)$ with source impedance $Z_S$.

In the drawings, preferred embodiments of the invention are illustrated by way of example. It is to be expressly understood that the description and drawings are only for the purpose of illustration and as an aid to understanding and are not intended as a definition of the limits of the invention.

BEST MODE FOR CARRYING OUT THE INVENTION

In the description that follows, like parts are marked throughout the specification and the drawings with the same respective reference numerals. The drawings are not necessarily to scale and in some instances proportions may have been exaggerated in order to more clearly depict certain features of the invention.

Figure 2:
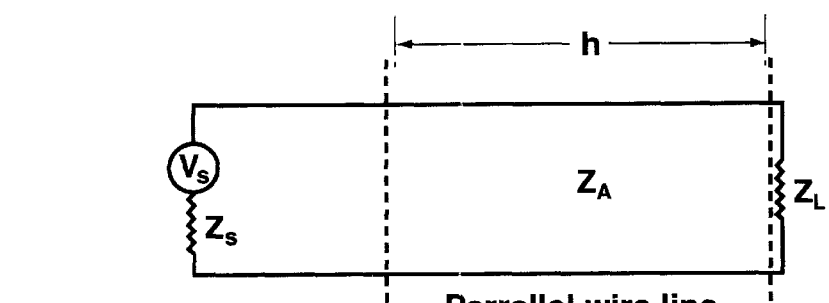
FIG. 2 is a schematic of a parallel wire transmission line equivalent which provides a means of emulating current flow on the antenna.
Figure 3:
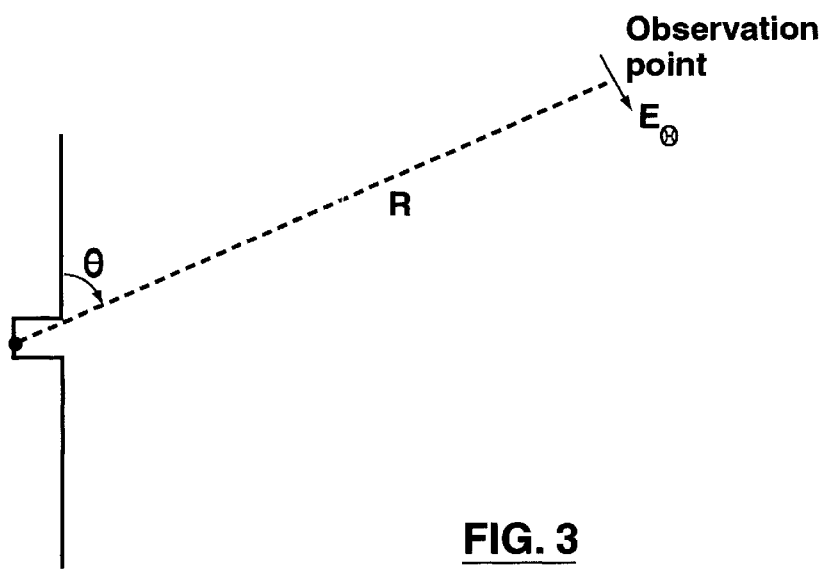
FIG. 3 is a schematic of a radiated electric field, $E_\Theta$, from the dipole source at an observation point at a distance R from the antenna feed point. The angle Θ measure the angle between the radius vector R to the observer and the dipole axis.

Referring to FIG. 4, circuit diagram which represents one half of the dipole antenna and the associated transmission lines which connect the source to the antenna plus a means to adapt the antenna loading to achieve the termination match at the ends of the antenna arms. In essence, FIG. 4 depicts half of the transmission line shown in FIG. 2. The other half of the transmission line is created from FIG. 4 by making a mirror image of the circuit shown here. (Samaddar, S. N. and Mohole, E. L., supra; Franceshetti, G. and Papas, supra; C. H., Ramo, S., Whinney, J. R. and Van Duzer, T., *Fields and Waves in Communication Electronics;* 1958; John Wiley & Sons, Inc., USA).

As indicated previously, all aspects of source and antenna must be matched to achieve the desired goal of creating a current on the antenna arm, which mimics the excitation voltage v(t). From basic transmission line theory (Ramo, S., Whinney, J. R. and Van Duzer, T., supra), two conditions are required to achieve proper source matching to antenna feed. These are $$Z_f = Z_S \qquad (6)$$

$$Z_f = \frac{1}{\left(\frac{1}{Z_A} + \frac{1}{Z_R} + \frac{1}{Z_C}\right)} \qquad (7)$$

If these conditions are achieved then the following current enters the antenna arm, which has the following character.

$$i_A(t) = 1/2 \frac{v(t)}{Z_A} \qquad (8)$$

With the matching of Equations 6 and 7 being achieved, there are no source connection reverberations, which distort the source voltage signal.

By design, the antenna arm impedance $Z_A$ is kept much larger than the feed terminating coaxial or the matching resister $Z_F$, $Z_R$, and $Z_C$. As a result, minor variations in $Z_A$ have little impact on the feed matching condition Equation 7. $Z_R$ is used to trim any systematic variation in $Z_A$ that could affect the balance on a continuing basis. The antenna arm impedance $Z_A$ can always be kept large by making sure that the antenna arm radius to length ratio is kept small.

The coaxial feed 3 and terminating coaxial cables 6 are clad in a high electromagnetic impedance material usually formed from lossy high magnetic permeability media. Such cladding materials 8 eliminate radio frequency signal currents from traveling on the outside of the coaxial cable shields. All currents are forced to stay within the shield. As a result such coaxial shields will not generate radiated signals.

The antenna arm is immersed in a dielectric cladding which results in a propagation velocity $c_A$ for the currents on the antenna arm. The current $i_A(t)$ will reach the end of the antenna arm at a time $$\frac{h}{c_A}.$$

The essence of matching the antenna arms to the termination point of the arms is achieved by using the signal travelling in the terminating coax 6 as a source of signal to cancel the current $i_A(t)$ causing this current to vanish at the end of the antenna as if the arm impedance $Z_A$ were terminated into a matched load. Two conditions are required to achieve this goal. The first condition is to adjust the length of coaxial line 6 and the antenna arm potting material must be selected such that $$\frac{L_c}{c_c} = \frac{h}{c_a} \qquad (9)$$

In other words, the currents along the antenna arm and terminating coax line must reach the terminating impedance $Z_L$ at the same time. Note of course that the potting material affects the values of both $Z_A$ and $c_A$.

The second condition is to select the terminating load for the terminating coax cable, $Z_L$, such that the impedance mismatch at the end of the terminating coax just matches the effect of the antenna arm current $i_A(t)$ as it enters the terminating coaxial cable. This occurs when $$Z_L = \frac{Z_L Z_C}{Z_A - Z_C} \qquad (10)$$

In some applications, the matching may also be accomplished by active circuit elements placed at the end of the transmission line. The basic concept is identical in terms of timing and matching but $Z_L$ is replaced by an active circuit element and the transmission cable signal carries time synchronization to the active circuit element rather than the matching signal.

A wide variety of matching and application optimization can be achieved depending on the selection of the potting or embedding material for the antenna arm. With GPR, the antenna is frequently in close proximity to the media to be probed. The electromagnetic properties of media can vary substantially. By making the potting material somewhat typical of average materials reduces the variability in $Z_A$ associated with nearby media charges and enhances the energy coupling into the material.

In applications where the use of an antenna embedded in a dielectric is not needed, the time synchronization of the antenna signal and the cancellation signal can be achieved by an active circuit following the same logic as described here.

The use of the high impedance coating material on the terminating coaxial cable (6) forces all of the currents to remain internal to the coax. As such all the currents are contained or of common mode in character and no radiation from the coax transmission line occurs. As a result, the radiated signal remains that of the simple dipole antenna arm as described in Equation 5. FIG. 5 shows the antenna arm and terminating coax while FIG. 6 shows a final unit with potted antenna arms and high permeability and lossy material on terminating coax and feed lines.

FIG. 7 contains a table outlining the different applications that the invention may be applied to. More specifically, the applications represent the different desired targets or uses for the antenna.

Various embodiments of the invention have now been described in detail. Since changes in and/or additions to the above-described best mode may be made without departing from the nature, spirit or scope of the invention, the invention is not to be limited to said details.

We claim:

1. An ultra-wide band antenna with predictable polarization and directivity for creating and capturing an electromagnetic field comprising:
   (a) a voltage source supplying a current;
   (b) a first transmission line embedded in a shielding medium attached to said voltage source for carrying said current;
   (c) a second transmission line embedded in a shielding medium attached to said first transmission line for carrying said current;

(d) an electrically conductive radiating member embedded in a potting medium for carrying said current and attached to said first and second transmission lines for carrying said current, said current carried by said electrically conductive radiating member cancelled by said current carried by said second transmission line.

2. An ultra-wide band antenna with predictable polarization and directivity for creating and capturing an electromagnetic field as claimed in claim 1 wherein said shielding medium is an absorbing high electromagnetic impedance medium.

3. An ultra-wide band antenna with predictable polarization and directivity for creating and capturing an electromagnetic field as claimed in claim 2 wherein said absorbing high electromagnetic impedance medium is lossy, high magnetic permeability media.

4. An ultra-wide band antenna with predictable polarization and directivity for creating and capturing an electromagnetic field as claimed in claim 2 wherein said electrically conductive radiating member is an antenna arm.

5. An ultra-wide band antenna with predictable polarization and directivity for creating and capturing an electromagnetic field as claimed in claim 2 wherein said first and second transmission lines are solid shield coaxial transmission lines.

6. An ultra-wide band antenna with predictable polarization and directivity for creating and capturing an electromagnetic field as claimed in claim 5 said first transmission line is impedance matched with a selected impedance element placed in parallel circuit connection with said electrically conductive radiating element and said second transmission line.

7. An ultra-wide band antenna with predictable polarization and directivity for creating and capturing an electromagnetic field as claimed in claim 5 wherein said potting medium is dielectric material whose properties can be selected over a range of values.

8. An ultra-wide band antenna with predictable polarization and directivity for creating and capturing an electromagnetic field as claimed in claim 5 wherein the physical properties of said potting medium are adjusted to modify the electromagnetic impedance of said antenna arm in a prescribed manner.

9. An ultra-wide band antenna with predictable polarization and directivity for creating and capturing an electromagnetic field as claimed in claim 5 wherein the impedance of said antenna arm is varied by adjusting the geometry of said antenna arm.

10. An ultra-wide band antenna with predictable polarization and directivity for creating and capturing an electromagnetic field as claimed in claim 5 wherein said potting compound is varied to modify the electromagnetic velocity of current travelling on said antenna arm.

11. An ultra-wide band antenna with predictable polarization and directivity for creating and capturing an electromagnetic field as claimed in claim 5 wherein the length of said second transmission line and the electromagnetic velocity of said current on said antenna arm are adjustable whereby the travelling time on said second transmission line and said antenna arm are equal.

12. An ultra-wide band antenna with predictable polarization and directivity for creating and capturing an electromagnetic field as claimed in claim 5 wherein said second transmission line further comprises an active circuit element for canceling said current carried by said antenna using time synchronization.

13. An ultra-wide band antenna with predictable polarization and directivity for creating and capturing an electromagnetic field as claimed in claim 6 wherein said potting medium is made of a similar medium as said antenna arm for reducing the impedance of said antenna arm.

14. An ultra-wide band antenna with predictable polarization and directivity for creating and capturing an electromagnetic field as claimed in claim 5 wherein said voltage source is a detection circuit for a receiving sensor.

15. The use of an ultra-wide band antenna with predictable polarization and directivity for creating and capturing an electromagnetic field comprising:

(a) supplying a current from a voltage source;

(b) attaching to said voltage source for carrying said current a first transmission line embedded in a shielding medium;

(c) attaching to said first transmission line a second transmission line embedded in a shielding medium for carrying said current;

(d) attaching to said first and second transmission lines an electrically conductive radiating member embedded in a potting medium for carrying said current;

(e) canceling said current carried by said electrically conductive radiating member by said current carried by said second transmission line.

16. The use of an ultra-wide band antenna with predictable polarization and directivity for creating and capturing an electromagnetic field as claimed in claim 15 wherein said electrically conductive radiating member further comprising an antenna arm for carrying said current.

17. The use of an ultra-wide band antenna with predictable polarization and directivity for creating and capturing an electromagnetic field as claimed in claim 16 further comprising adjusting said second transmission line to the length of said antenna arm whereby said currents along said antenna arm and said second transmission line reach a terminating load at the same time.

18. The use of an ultra-wide band antenna with predictable polarization and directivity for creating and capturing an electromagnetic field as claimed in claim 17 further comprising matching said current carried by said antenna arm with said mismatched impedance of said antenna arm and said second transmission line by selecting said terminating load for said second transmission line.

19. The use of an ultra-wide band antenna with predictable polarization and directivity for creating and capturing an electromagnetic field as claimed in claim 15 selected from the group consisted of agriculture, airports, archeology, biocounting, bridges, building inspection, concrete, conveyor belts, dams, environmental, forensics. police matters, geotechnical, gravelpits, graveyards, groundwater, hydro power, nuclear power, ice detection, snow detection, lakes, rivers, military, mining, pipe inspection, sewer inspection, quarries, milroads, real estate roads, security, immigration, customs, smelters, treasure mapping, trenchless technology, tunnelling, utility works, pipes and wood inspection.

20. The use of an ultra wide band antenna with predictable polarization and directivity for creating and capturing an electromagnetic field as claimed in claim 15 with a multi-transducer configuration to reduce parasitic interference associated with reverberation of said current.

* * * * *